United States Patent [19]

Stephenson

[11] Patent Number: 5,080,135
[45] Date of Patent: Jan. 14, 1992

[54] LARGE DEFLECTION ANGLE ROTARY MODULATION STEERING VALVE

[75] Inventor: Dwight B. Stephenson, Savage, Minn.
[73] Assignee: Eaton Corporation, Cleveland, Ohio
[21] Appl. No.: 602,829
[22] Filed: Oct. 24, 1990
[51] Int. Cl.$^5$ .................. F15B 13/04; F15B 13/10
[52] U.S. Cl. ................. 137/625.24; 60/384; 91/467
[58] Field of Search ............ 60/384; 91/467; 137/625.24

[56] References Cited

U.S. PATENT DOCUMENTS 3,819,307 6/1974 Uppal ............... 137/625.24 X
4,232,708 11/1980 Miller ................... 60/384 X Primary Examiner—Gerald A. Michalsky
Attorney, Agent, or Firm—L. J. Kasper

[57] ABSTRACT

A fluid controller (11) is disclosed for controlling the flow of fluid from a source (73) to a steering cylinder (77), especially for use on large, articulated vehicles. The controller includes a fluid meter (17) and a valving arrangement including a spool (33) and a sleeve (37). The housing and the valving define a main fluid path (113) including a main variable flow control orifice (A1), and the fluid meter (17) in series flow relation between an inlet port (23) and the first control fluid port (27). In accordance with the invention, the main variable flow control orifice is formed by a first fluid passage (93R; 123L) defined by the spool, being in fluid communication with a first fluid port means (101R; 131R) defined by the sleeve. The first fluid port means extends circumferentially to provide continuous fluid communication between the inlet port and the first fluid passage of the spool, as the spool rotates relative to the sleeve from the neutral position to the first operating position. The relative rotation of the spool and sleeve extends at least about 45 degrees, and in the subject embodiment, extends about 60 degrees. The substantially greater rotational displacement between the spool and the sleeve substantially reduces the incidence of lateral jerk without the need for a cushion valve or an accumulator within the system.

27 Claims, 11 Drawing Sheets

LARGE DEFLECTION ANGLE ROTARY MODULATION STEERING VALVE

BACKGROUND OF THE DISCLOSURE

The present invention relates to fluid controllers of the type used to control the flow of fluid from a source of pressurized fluid to a fluid pressure operated device, such as a vehicle steering cylinder.

A typical fluid controller of the type to which the present invention relates includes a housing which defines various fluid ports, and further includes a fluid meter, controller valving, and an arrangement for imparting follow-up movement to the valving in accordance with the flow through the fluid meter. The flow through the controller valving is directly proportional to the area of the main variable flow control orifice which, in turn, is proportional to the relative displacement between the valve members comprising the controller valving.

Fluid controllers of the type to which the present invention relates are frequently used on large, heavy vehicles. More particularly, such controllers are frequently used on articulated vehicles which have high inertia loads on the opposite side of the wheels from the pivot joint. The weight of such vehicles, and the inertia loads, have made it difficult to achieve smooth steering action, and as a result is has become common practice on such vehicles to provide a cushion valve in the lines interconnecting the fluid controller and the steering cylinder. In some systems, an accumulator is used instead of a cushion valve. One of the purposes of using either a cushion valve or an accumulator is to reduce the "lateral jerk" which occurs, for example, when the vehicle operator has been steering in one direction, then returns the steering wheel to its centered position, thus closing the controller valving. The lateral jerk occurs as a result of vehicle inertia driven pressure pulses within the system which occur because the vehicle operator is able to move the controller valving from one operating condition to another (e.g. from maximum displacement in one direction to neutral) faster than the system can deccelerate the lateral motion of the vehicle.

Although the present invention can be used with various types of controllers having various valving architectures, it is especially advantageous when used with a controller having a valving of the rotary spool-sleeve type, and will be described in connection therewith. In the typical, prior art spool-sleeve controller, the various flow orifices in the controller valving are each comprised of a plurality of ports in the sleeve overlapping a plurality of passages defined by the spool, the cumulative overlap thereof comprising a particular flow control orifice.

In conventional spool-sleeve controllers, it has been accepted practice to provide six of each of the sleeve ports and six of each of the respective spool passages. It is believed that this is done partially out of concern for proper radial balancing of the sleeve, relative to the spool. However, as a result, in the prior art spool-sleeve controller, the relative displacement between the spool and sleeve has been somewhat limited. Typically, the relative displacement between the spool and sleeve in going from neutral to maximum displacement has been only about 10 or 12 degrees, although in some larger, more recent controllers, the maximum relative displacement between the spool and sleeve is about 19 degrees.

Although the controller valving of the type described above has been generally satisfactory, it has frequently resulted in excessive lateral jerk when such controllers are used on large articulated vehicles, thus necessitating the use of a cushion valve or an accumulator in the system. The use of an accumulator has normally resulted in satisfactory performance, but an accumulator adds substantial expense to the system, and requires a substantial amount of additional maintenance. On the other hand, a cushion valve provides generally satisfactory cushioning of at least a first pressure spike, but not always of successive pressure spikes. In addition, a typical cushion valve adds substantially to the cost of the system.

SUMMARY OF THE INVENTION

Accordingly, it is an object of the present invention to provide a fluid controller for use in a steering system wherein the controller is capable of substantially reducing the lateral jerk in an articulated vehicle, without the need for a cushion valve or accumulator in the steering system.

The above and other objects of the invention are accomplished by the provision of an improved controller of the type including housing means defining an inlet port for connection with a source of pressurized fluid, a return port for connection to a reservoir, and first and second control fluid ports for connection to a fluid pressure operated device. Valve means is disposed in the housing and comprises a primary rotatable valve member and a cooperating, relatively rotatable follow-up valve member. The primary follow-up valve members define a neutral position and a first operating position in which the primary valve member is rotatably displaced from the neutral position relative to the follow-up valve member. The primary valve member defines a first fluid passage and the follow-up valve member defines first fluid port means in continuous fluid communication with the inlet port. The first fluid port means is blocked from fluid communication with the first fluid passage when the valve members are in the neutral position. The first fluid port means is in fluid communication with the first fluid passage to define a first flow control orifice when the valve members are in the first operating position. The housing means and the valve members cooperate to define a first main fluid path providing communication from the inlet port through the first variable flow control orifice to the first control fluid port when the valve members are in the first operating position.

The improved controller is characterized by the first fluid passage comprising an axially-oriented passage defined by an outer cylindrical surface of the primary valve member. The first fluid port means comprises circumferentially-extending port means operable to provide continuous fluid communication between the inlet port and the first fluid passage means as the primary valve member rotates, relative to the follow-up valve member, from the neutral positions to the first operating position. The relative rotation of the primary valve member extends at least about 45 degrees.

DESCRIPTION OF THE PREFERRED EMBODIMENTS

Figure 1:
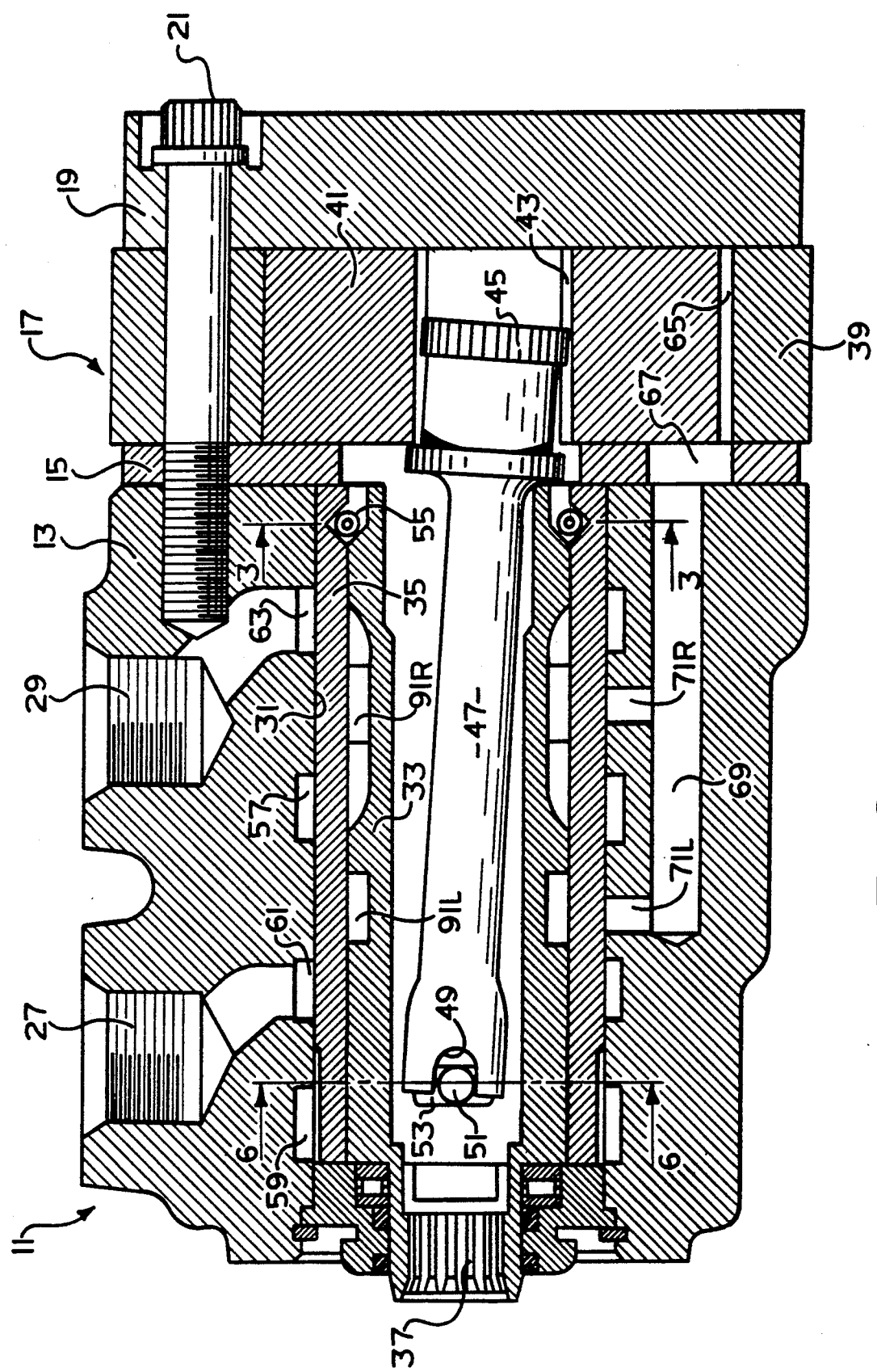
FIG. 1 is an axial cross-section of a fluid controller of the type to which the present invention relates.

Referring now to the drawings, which are not intended to limit the invention, FIG. 1 illustrates a fluid controller made in accordance with the teachings of the present invention. The controller, which is generally designated 11, may be of the general type illustrated and described in U.S. Pat. No. 25,126, and in the subject embodiment, is more specifically of the type illustrated and described in U.S. Pat. No. 4,862,690, both of which are assigned to the assignee of the present invention and incorporated herein by reference.

Referring still to FIG. 1, the fluid controller 11 comprises several sections including a valve housing 13, a port plate 15, a section comprising a fluid meter 17, and an end cap 19. These sections are held together in tight sealing engagement by means of a plurality of bolts 21, which are in threaded engagement with the valve housing 13.

The valve housing 13 defines a fluid inlet port 23 (shown only in FIG. 2), a fluid return port 25 (also shown only in FIG. 2), and a pair of control (cylinder) fluid ports 27 and 29. The valve housing 13 also defines a valve bore 31, and rotatably disposed therein is a valving arrangement, comprising a primary, rotatable valve member 33 (referred to hereinafter as the "spool"), and a cooperating, relatively rotatable follow-up valve member 35 (referred to hereinafter as the "sleeve"). At the forward end of the spool 33 is a portion having a reduced diameter, and defining a set of internal splines 37 which provide for direct mechanical connection between the spool 33 and a steering wheel (not shown). The spool 33 and sleeve 35 will be described in greater detail subsequently.

The fluid meter 17 may be of the type well known in the art, and in the subject embodiment, includes an internally-toothed ring member 39, and an externally-toothed star member 41, which is eccentrically disposed within the ring member 39, for orbital and rotational movement relative thereto. The star member 41 defines a set of internal splines 43, and in splined engagement therewith is a set of external splines 45 formed at the rearward end of a main drive shaft 47. The drive shaft 47 has a bifurcated forward end portion 49 permitting driving connection between the shaft 47 and the sleeve 35, by means of a drive pin 51. The ends of the pin 51 pass through a pair of circumferentially-elongated pin openings 53 (see FIG. 6) defined by the spool 33, and are received in relatively close fitting openings in the sleeve 35.

Figure 3:
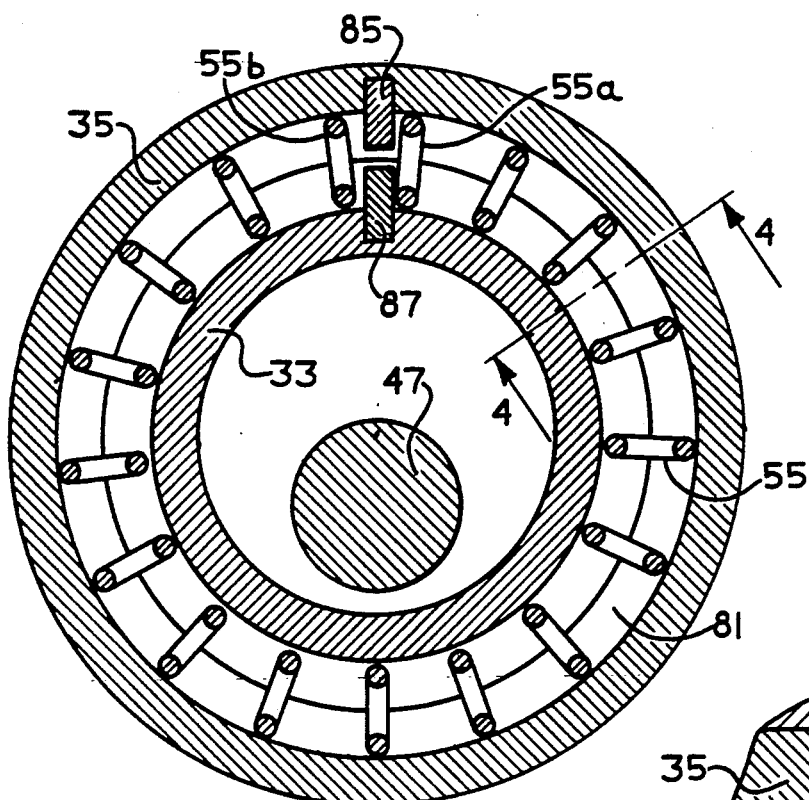
FIG. 3 is an enlarged, fragmentary, transverse cross-section taken on line 3—3 of FIG. 1, with the spool and sleeve in their relative neutral position.
Figure 4:
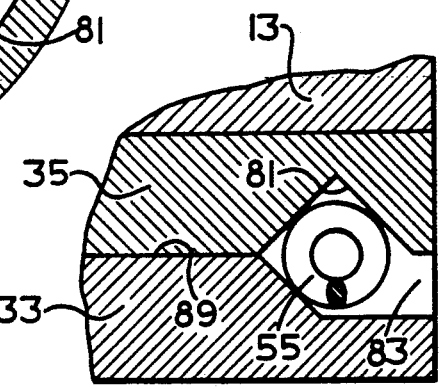
FIG. 4 is an axial cross-section taken on line 4—4 of FIG. 3, and on substantially the same scale as FIG. 3.
Figure 5:
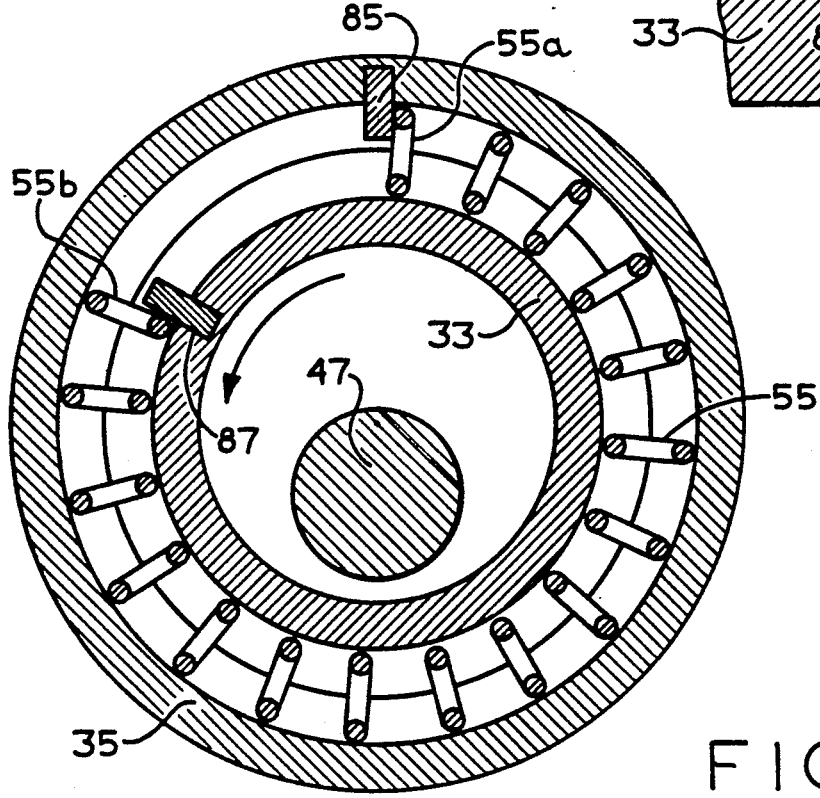
FIG. 5 is a transverse cross-section, similar to FIG. 3, illustrating the spool and sleeve in a relatively displaced position.

As is well known to those skilled in the art, pressurized fluid flowing from the inlet port 23 through the various passages defined by the spool 33 and sleeve 35 then flows through the fluid meter 17, causing orbital and rotational movement of the star 41 within the ring 39. Such movement of the star 41 causes rotational follow-up movement of the sleeve 35, by means of the drive shaft 47 and drive pin 51, to maintain a particular relative rotational displacement between the spool 33 and sleeve 35, proportional to the rate of rotation of the steering wheel. The spool and sleeve are biased toward the relative neutral position, shown in FIGS. 3, 6 and 7, by means of a helical, coil centering spring 55, which is shown in FIGS. 3-5 and which will be described in greater detail subsequently.

Referring still primarily to FIG. 1, the valve bore 31 of the housing 13 defines a plurality of annular fluid chambers surrounding the sleeve 35, to provide fluid communication between the various ports and the outer surface of the sleeve 35. An annular chamber 57 receives pressurized fluid from the inlet port 23, while an annular chamber 59 communicates return fluid to the return port 25. In addition, an annular chamber 61 provides communication to or from the control port 27, while an annular chamber 63 provides communication to or from the control port 29.

The toothed interaction of the star 41, orbiting and rotating within the ring 39, defines a plurality of expanding and contracting fluid volume chambers 65, and adjacent each such volume chamber 65, the port plate 15 defines a fluid port 67. The valve housing 13 defines a plurality of axial bores 69 (only one of which is shown in FIG. 1), each of which is in open communication with one of the fluid ports 67. The valve housing 13 further defines a pair of radial bores 71L and 71R, providing communication between each of the axial bores 69 and the valve bore 31.

Figure 2:
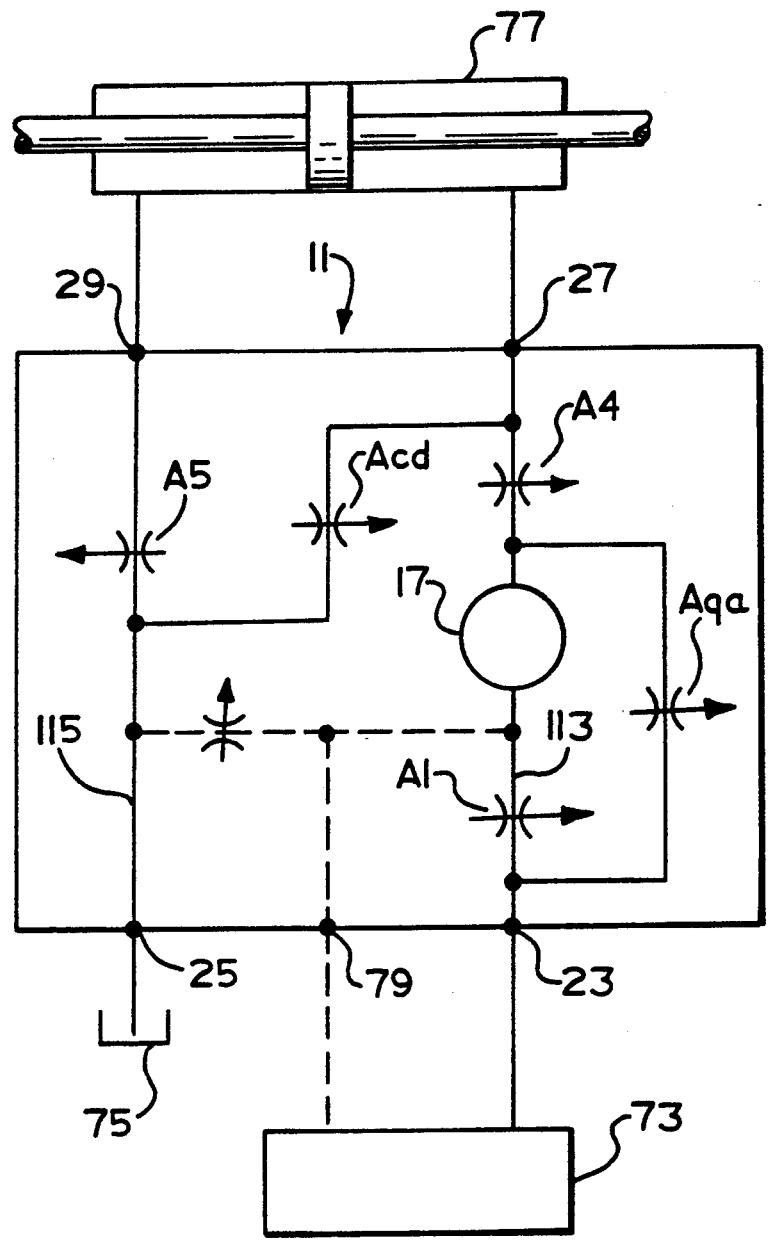
FIG. 2 is a unidirectional orifice diagram illustrating the fluid controller of FIG. 1, being utilized in a steering system.

Referring now primarily to FIG. 2, the fluid controller 11 is illustrated in a steering system in which the inlet port 23 of the controller 11 receives pressurized fluid from a source 73 of pressurized fluid, while the return port 25 is in fluid communication with a system reservoir 75. The source 73 would typically comprise a hydraulic pump, but as the term "source" is used herein, it could also comprise various other elements, such as a load sensing priority flow control valve and pump combination of the type illustrated and described in U.S. Pat. No. 4,043,419, assigned to the assignee of the present invention and incorporated herein by reference. The control ports 27 and 29 are connected to the opposite ends of a steering cylinder 77. Although the controller 11 was not described in connection with FIG. 1 as having a load sensing port, the controller 11 in FIG. 2 is illustrated schematically as having a load sensing port 79, which may be connected to the source 73 in any of the ways now well known in the art, thereby controlling the output of the source 73 in response to the level of the load signal at the load sensing port 79. There will be further reference to FIG. 2 subsequently, in connection with the description of the various flow paths and orifices within the controller 11.

Referring now primarily to FIGS: 3 through 5, the centering spring arrangement of the present invention will be described. As is well known to those skilled in the art, in the conventional rotary spool-sleeve fluid controller, the possible relative rotational displacement between the spool and sleeve is anywhere from about 10 degrees to about 19 degrees. For such limited relative displacements, it was sufficient to provide a centering spring arrangement comprising a plurality of flat leaf spring members extending through diametrically opposed openings in the spool and sleeve. Such an arrangement is illustrated and described in U.S. Pat. No. 3,819,307, assigned to the assignee of the present invention and incorporated herein by reference. It is one important aspect of the present invention that the relative rotational displacement between the spool 33 and the sleeve 35 be substantially greater than that which has typically occurred in the prior art. By way of example only, in the subject embodiment, the maximum relative displacement between the spool and sleeve is approximately 60 degrees. Therefore, a centering spring arrangement is required which differs substantially from that known in the prior art.

Referring still to FIGS. 3 through 5, the sleeve 35 defines an annular groove 81 having a generally V-shaped cross-section adjacent the rearward end of the sleeve 35, i.e., toward the right end in FIG. 1. Adjacent the groove 81, the spool 33 defines a recess 83, having a generally rectangular cross-section. Disposed in both the groove 81 and the recess 83 is the helical coil centering spring 55 referred to previously. As may best be seen in FIGS. 3 and 5, a Woodruff key 85 is inserted in a slot in the end of the sleeve 35, and a similar Woodruff key 87 is inserted in a slot in the end of the spool 33. The keys 85 and 87 serve as the seats for the spring 55 in a manner which is already generally well known in regard to springs such as the spring 55.

In order to assemble the spring arrangement, both of the keys 85 and 87 are inserted in the sleeve 35 and spool 33, respectively, and then the spring 55 is positioned within the groove 81 in the sleeve. Subsequently, the spool 33 is inserted into the sleeve, with the rearward end of the spool being inserted into the forward (left end in FIG. 1) end of the sleeve and then moved to the relative position shown in FIG. 1. While this is being done, the spool and sleeve must be in their relative neutral position (shown in FIG. 3) so that the key 87 will be aligned with the key 85, and slide between the ends of the spring 55 to the position shown in FIG. 3.

Referring now primarily to FIG. 5, when the steering wheel and spool 33 are rotated in the counterclockwise position (see arrow in FIG. 5), one end 55a of spring 55 remains seated against the key 85, while another end 55b of the spring remains seated against the key 87, and thus the spring 55 is compressed gradually as the spool 33 rotates from its relative neutral position shown in FIG. 3 to its fully displaced operating position shown in FIG. 5. As will be readily understood by those skilled in the art, once the steering wheel is released, the centering spring 55 will bias the spool 33 from its displaced, operating position shown in FIG. 5, causing it to return to its relative neutral position shown in FIG. 3.

In the embodiment of FIG. 1, the spring 55 is located toward the rear end of the spool and sleeve, i.e., toward the right end thereof in FIG. 1. However, it should be apparent to those skilled in the art that the novel centering spring arrangement illustrated in FIGS. 1 and 3 through 5 could, within the scope of the invention, be located elsewhere, such as adjacent the forward end of the spool and sleeve, i.e., adjacent the drive pin 51.

Figure 6:
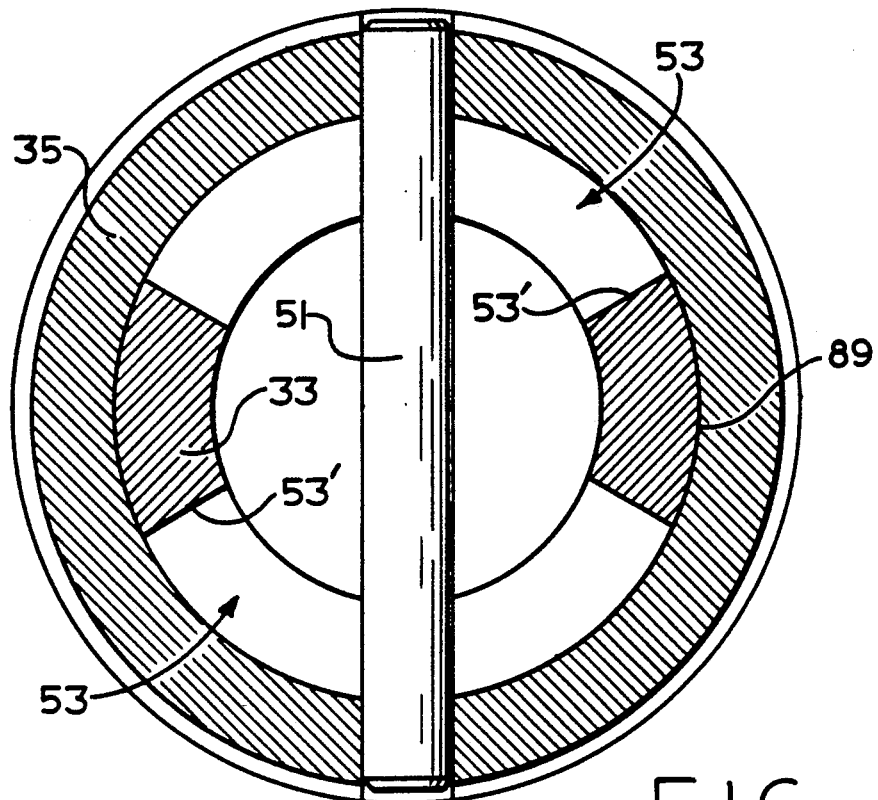
FIG. 6 is an enlarged, fragmentary, transverse cross-section, taken on line 6—6 of FIG. 1.
Figure 10:
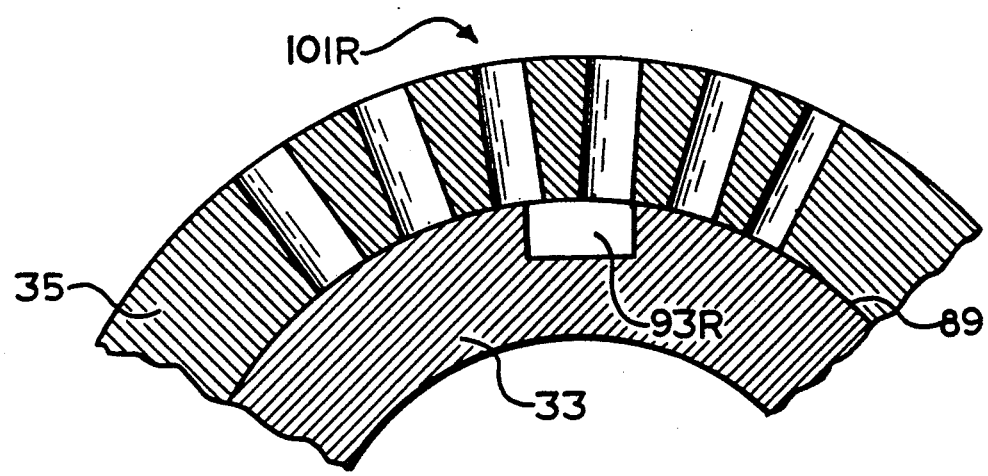
FIG. 10 is a fragmentary, transverse cross-section showing the spool and sleeve, taken on line 10—10 of FIG. 8.

Referring now to FIG. 6, the spool 33 is illustrated in its neutral position, relative to the sleeve 35, and the opposite ends of the drive pin 51 are centered relative to the circumferentially-extending pin openings 53. The general arrangement illustrated in FIG. 6 is well known to those skilled in the art. However, in order to accommodate the relatively large angular displacement between the spool and sleeve (see FIG. 5), the pin openings 53 must extend a similar angular amount, on either side of each end of the pin 51. Thus, it may be seen in FIG. 6 that rotation of the steering wheel and spool 33 will not result in operation "on the pin" until the full 60 degrees displacement between the spool and sleeve has occurred.

As will also be understood by those skilled in the art, the compression of the centering spring 55, and the rotation of the spool 33 relative to the sleeve 35, are limited by the drive pin 51 moving within the elongated pin opening 53. For example, in the position shown in FIG. 5, the spool 33 is in such a position that a pair of opening end walls 53' (see FIG. 6) are in engagement with the drive pin 51. As was mentioned previously, and as may be seen in FIGS. 5 and 6, the subject embodiment of the invention would permit about 60 degrees rotation of the spool 33 relative to the sleeve 35.

FIG. 7 - Valving

Figure 7:
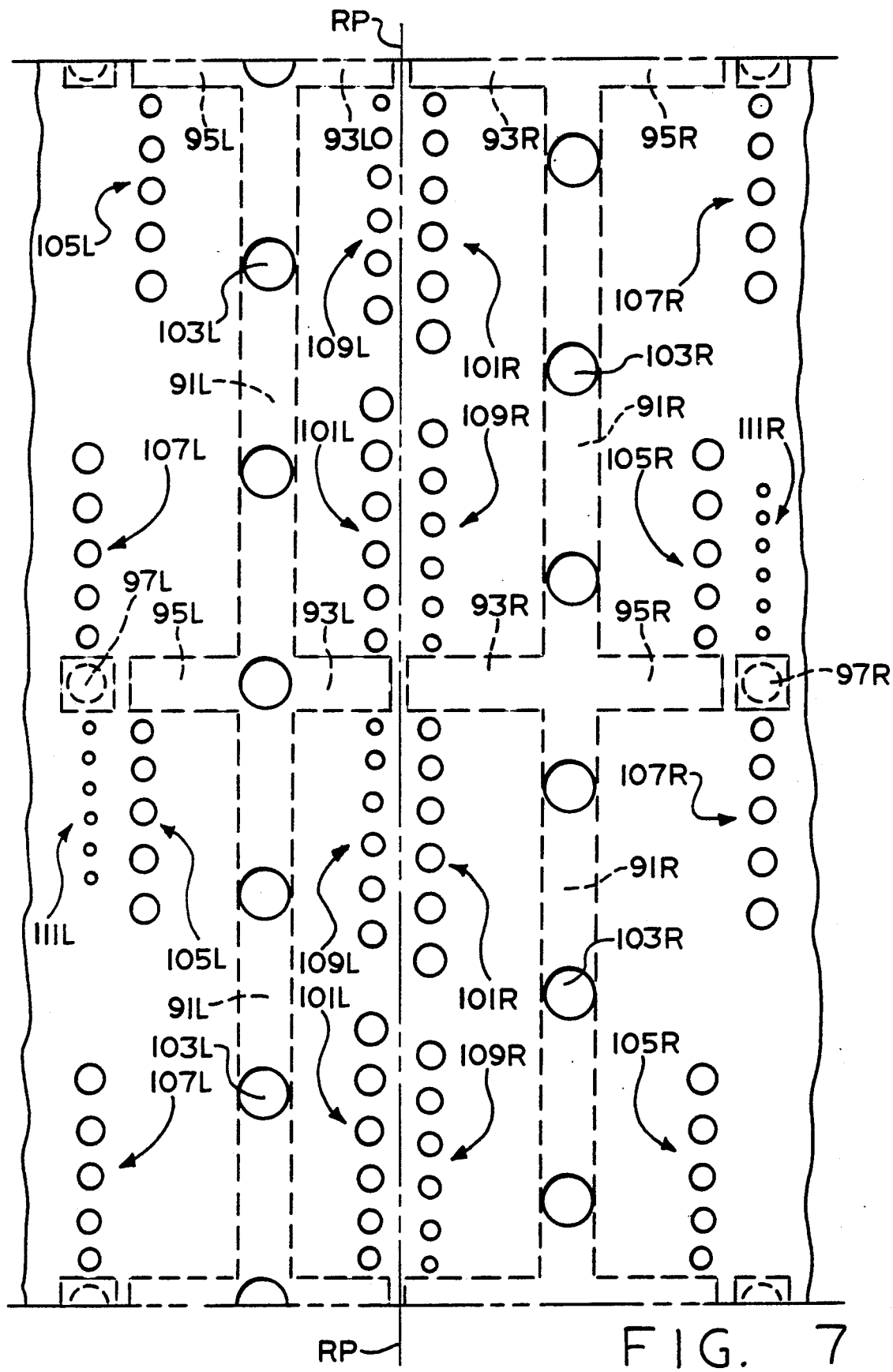
FIG. 7 is a fragmentary, overlay view of the spool and sleeve valve members used in the fluid controller of FIG. 1, but on a larger scale than FIG. 1, and with the spool and sleeve in their relative neutral position.

Referring now primarily to FIG. 7, the spool 33 and sleeve 35 will be described in greater detail, with regard to the valving aspect of the present invention. In connection with the subsequent description, it should be noted that many of the ports and passages are arranged generally symmetrically with respect to a central reference place RP, and such elements will be described by a reference numeral followed by either an L or an R to indicate that the element is located on either the left side or the right side, respectively, of the reference plane RP. Furthermore, it should be understood that the overlay view in FIG. 7 (and also in FIGS. 8 and 9) are intended to illustrate primarily the interface between the spool 33 and the sleeve 35, i.e., the grooves and passages defined by an outer surface 89 (see FIG. 6) of the spool 33 (dashed lines), and the port openings defined at an adjacent inner surface of the sleeve 35 (solid lines).

Figure 8:
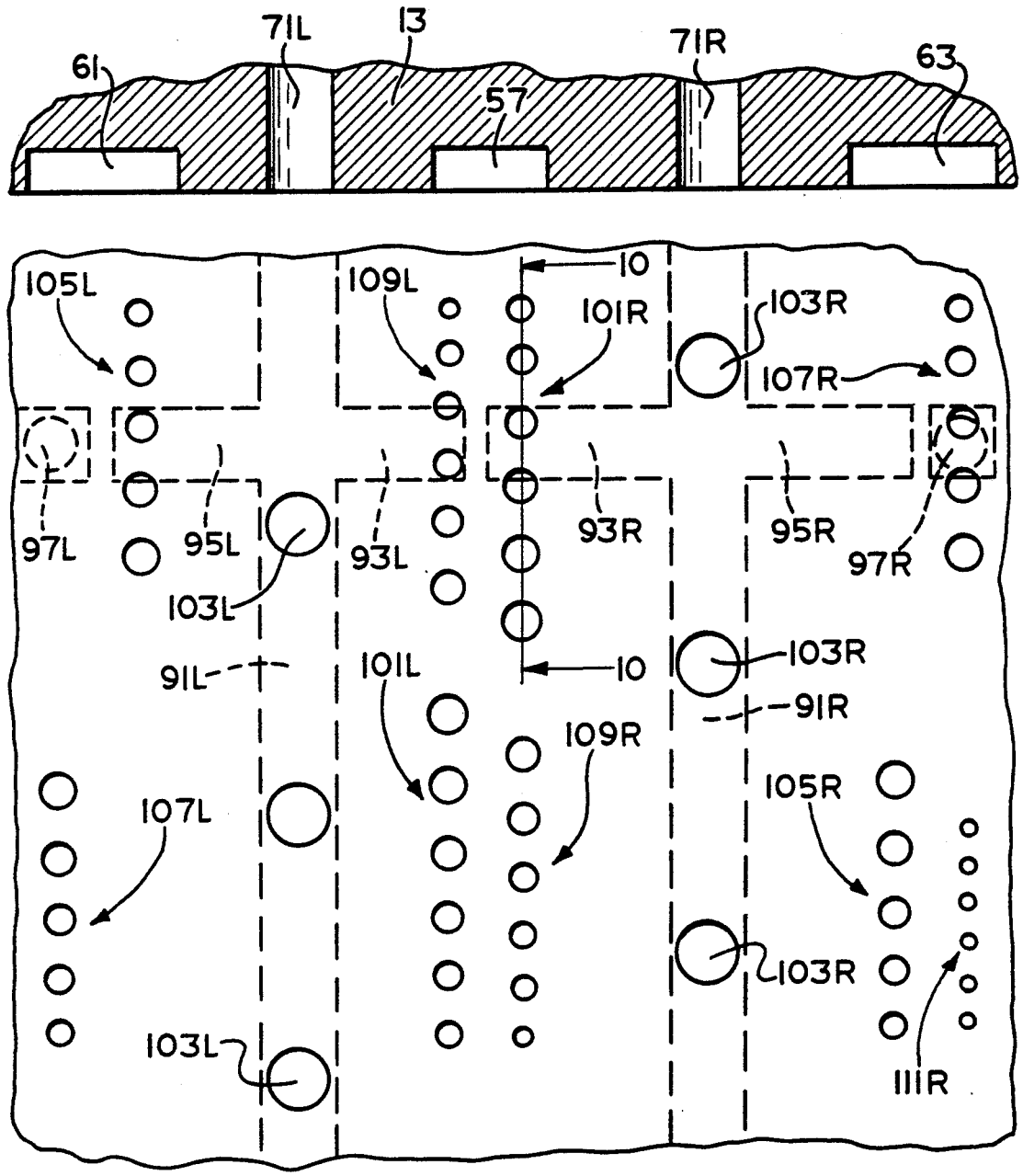
FIG. 8 is a further enlarged, fragmentary, overlay view, similar to FIG. 7, with the spool and sleeve in an intermediate operating position.
Figure 9:
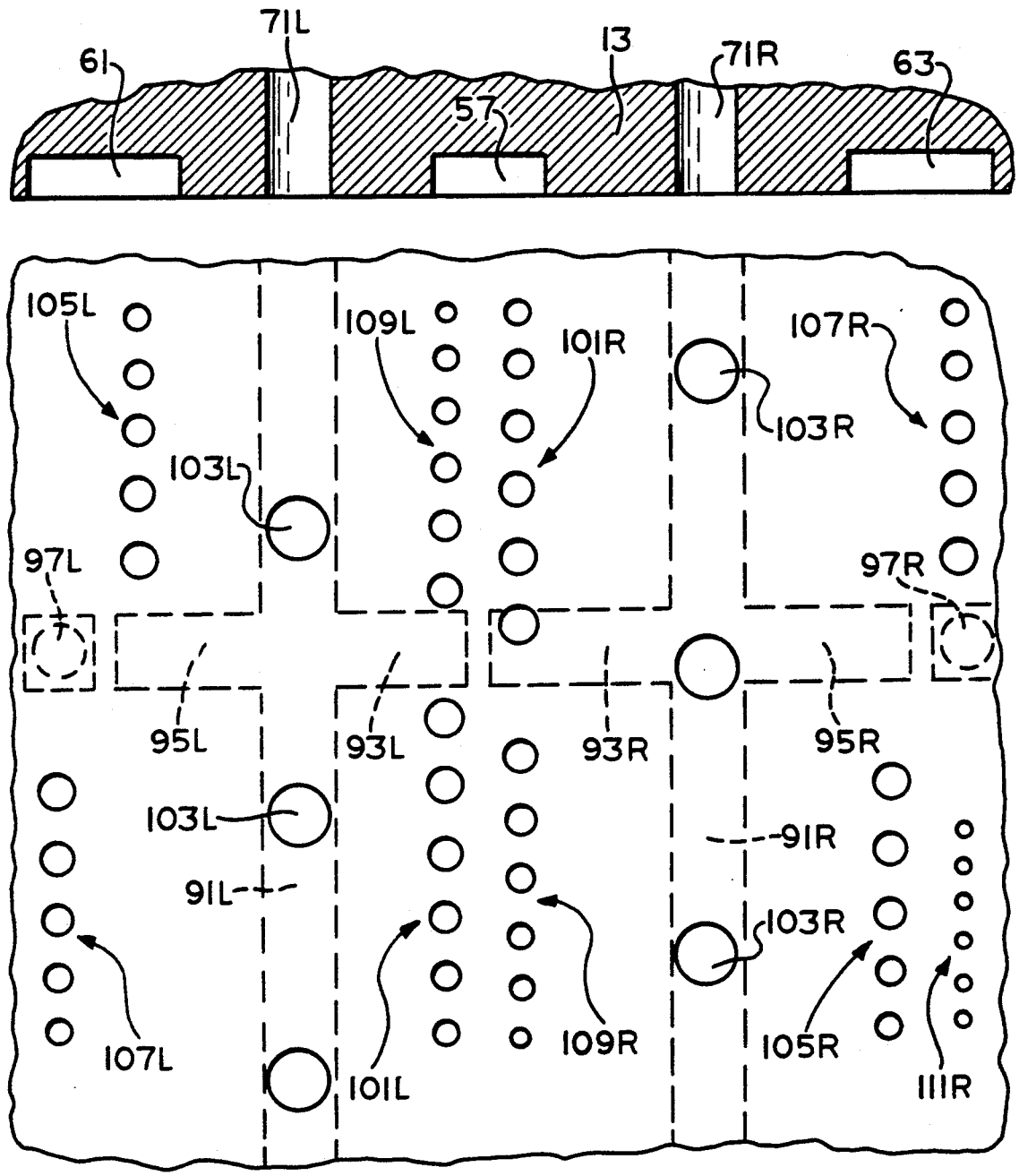
FIG. 9 is an overlay view, similar to FIGS. 7 and 8, but showing the spool and sleeve in the fully displaced, operating position.

It should be noted that the overlay view of FIG. 7 illustrates the entire 360 degrees circumferential extent of both the spool and the sleeve, whereas the enlarged, fragmentary views of FIGS. 8 and 9 illustrate only slightly more than 180 degrees of the circumferential extent of the spool and sleeve, to facilitate more detailed illustration of the invention.

Referring again primarily to FIG. 7, the spool 33 defines a pair of circumferential meter grooves 91L and 91R, which are approximately oppositely and equally disposed about the reference plane RP, and disposed to be axially aligned with the radial bores 71L and 71R respectively (see FIG. 8). In fluid communication with the meter groove 91L is a pair of pressure passages 93L, and in fluid communication with the meter groove 91R is a pair of pressure passages 93R. Also in fluid communication with the meter groove 91L is a pair of operating passages 95L, and in fluid communication with the meter groove 91R is a pair of operating passages 95R. In addition to the above-described grooves and passages which are formed on only the outer surface 89 of the spool 33, the spool defines a pair of tank ports 97L and 97R, disposed axially adjacent the ends of the operating passages 95L and 95R, respectively. The tank ports 97L and 97R are in fluid communication with the interior of the spool 33, so that return fluid passes through the interior of the spool, and radially outward through the pin openings 53 into the annular chamber 59, which communicates with the return port 25.

The sleeve 35 defines a pair of substantially identical groups of pressure ports 101L, and a pair of substantially identical groups of pressure ports 101R. All of the pressure ports 101L and 101R are disposed to be in continuous fluid communication with the inlet port 23 by means of the annular chamber 57. Approximately equally and oppositely disposed about the reference plane RP is a plurality of meter ports 103L, and a plurality of meter ports 103R. The meter ports 103L are disposed for commutating fluid communication with the radial bores 71L, and at the same time, are in continuous fluid communication with the meter groove 91L. Similarly, the meter ports 103R are disposed for commutating fluid communication with the radial bores 71R, while being in continuous fluid communication with the meter groove 91R.

Also approximately equally and oppositely disposed about the reference plane RP, and further therefrom than the meter ports, is a pair of substantially identical groups of operating ports 105L, and a pair of substantially identical groups of operating ports 105R. The operating ports 105L are disposed to be in continuous fluid communication with the control fluid port 27 by means of the annular chamber 61, while the operating ports 105R are disposed to be in continuous fluid communication with the control fluid port 29 by means of the annular chamber 63.

Also approximately equally and oppositely disposed about the reference plane RP, and still further therefrom than the operating ports, is a pair of substantially identical groups of return port 107L, and a pair of substantially identical groups of return ports 107R. The return ports 107L and 107R are axially disposed to be in fluid communication with the tank ports 97L and 97R, respectively, when the spool and sleeve are displaced from the neutral position shown in FIG. 7 to an operating position, as is illustrated in FIGS. 8 and 9.

Disposed adjacent each group of pressure ports 101L is a group of amplification ports 109R, and disposed adjacent each group of pressure ports 101R is a group of amplification ports 109L. The function of the amplification ports will be described in greater detail subsequently in connection with FIGS. 8 and 9, and referring back to the orifice diagram of FIG. 2.

Oppositely disposed about the tank port 97L from one of the groups of return ports 107L is a group of cylinder damping ports 111L. Similarly, disposed oppositely about the tank port 97R from one of the groups of return ports 107R is a group of cylinder damping ports 111R. The function of the damping ports 111L and 111R will be described in greater detail subsequently in connection with FIGS. 8 and 9 and the orifice diagram of FIG. 2.

FIGS. 8 and 9 - Operating Positions

Referring still to FIG. 7, when the spool and sleeve are in their relative neutral position (no rotation of the steering wheel), pressurized fluid is communicated from the inlet port 23 to the annular chamber 57, and then through all of the pressure ports 101L and 101R. However, with the spool and sleeve in the neutral position, flow through the pressure ports is blocked by the outer surface 89 of the spool, and therefore, the valving arrangement illustrated in FIGS. 7 through 9 is "closed center", although it will be apparent to those skilled in the art that the invention is not limited to closed-center valving.

It is believed that the basic operation of the fluid controller 11, and the spool and sleeve valving described thus far should be readily apparent in view of the teachings of the above incorporated U.S. Patents. However, the operation of the controller and valving will be described briefly, partly to relate the structure illustrated in FIGS. 7 through 9 to the orifice diagram of FIG. 2. As was noted previously, the controller 11 is illustrated in the orifice diagram of FIG. 2 as being load sensing, although the particular structure by which the spool and sleeve are able to communicate a load signal to the load sensing port 79 of FIG. 2 is not an essential feature of the present invention and is not illustrated or described in connection with FIGS. 7 through 9.

When the steering wheel is rotated at a particular speed of rotation, the spool 33 is displaced, relative to the sleeve 35, by a particular rotational displacement which corresponds to the speed of rotation of the steering wheel. Thereafter, with continued rotation of the steering wheel, the fluid flowing through the fluid meter 17 results in follow-up movement of the sleeve 35 to maintain the particular rotational displacement.

FIG. 8 illustrates the spool 33 being displaced, relative to the sleeve 35, in a manner corresponding to a right turn condition. With the spool 33 displaced as shown in FIG. 8, pressurized fluid flows from the annular chamber 57 through the two groups of pressure ports 101R and into the pressure passages 93R, the area of overlap therebetween cumulatively comprising a main variable flow control orifice A1 (see FIG. 2). This pressurized fluid flows into the meter groove 91R, then through the meter ports 103R, which engage in commutating fluid communication with the radial bores 71R, in a manner well known to those skilled in the art. The pressurized fluid (which at this point is considered "unmetered"), then flows through the fluid meter 17 (and is now considered "metered" fluid) and flows through the radial bores 71L which engage in commutating fluid communication with the meter ports 103L. This metered fluid then enters the meter groove 91L, then flows into the operating passages 95L. The fluid flowing through the main variable flow-control orifice A1, and through the fluid meter 17, constitutes a main fluid path 113.

At the same time, pressurized fluid is flowing through the annular chamber 57, and through the amplification ports 109L into the pressure passages 93L, the area of overlap therebetween cumulatively comprising a variable amplification orifice Aqa (see FIG. 2). This "amplification" fluid then combines with the previously-described metered fluid flowing into the operating passages 95L. For further explanation regarding the background, purpose, construction, and function of the amplification orifice Aqa, see U.S. Pat. No. 4,759,182, assigned to the assignee of the present invention and incorporated herein by reference.

The combination of the "metered" and "amplification" fluids then flows from the operating passages 95L through the operating ports 105L, the area of overlap therebetween cumulatively comprising a variable flow control orifice A4 (see FIG. 2). Flow through the A4 orifice then enters the annular chamber 61, then flows to the control port 27 (note that the relative positions of the control ports 27 and 29 appear to be reversed on the orifice diagram of FIG. 2, when compared with the cross section view of FIG. 1). Fluid from the port 27 flows to the steering cylinder 77 to effect a right turn of the vehicle, with fluid exhausted from the steering cylinder 77 returning to the control port 29, and then flowing to the annular chamber 63.

Low pressure, exhaust fluid in the annular chamber 63 flows through the return ports 107R, then through the tank ports 97R, the area of overlap therebetween cumulatively comprising a variable flow control orifice A5. Return fluid flows through the tank ports 97R to the interior of the spool 33, then out through the pin openings 53 into the annular chamber 59, and then to the return port 25, as was described previously. This flow of exhaust fluid constitutes a main fluid path 115. At the same time, the cylinder damping ports 111L, which are in fluid communication with the annular chamber 61 as are the operating ports 105L, are also in fluid communication with one of the tank ports 97L (not shown in FIG. 8), the area of overlap therebetween cumulatively comprising a variable cylinder damping orifice Acd (see FIG. 2). The cylinder damping orifice Acd dampens pressure pulses which otherwise could occur in the annular chamber 61 and the control port 27, which would have an undesirable effect upon the steering of the vehicle. For additional explanation of the background, purpose, construction, and function of the cylinder damping orifice Acd, see U.S. Pat. No. 4,781,219, assigned to the assignee of the present invention and incorporated herein by reference.

In FIG. 8, the spool 33 is illustrated as being rotatably displaced, relative to the sleeve 35, about 22 degrees, comprising only a partial opening of the variable orifices A1, A4, and A5. Referring now to FIG. 9, it may be seen that the spool 33 has now been rotatably displaced, relative to the sleeve 35, about 60 degrees which, as was explained previously, constitutes the maximum displacement position of the spool, relative to the sleeve, and also results in the maximum flow area for the various flow control orifices A1, A4, and A5.

. In accordance with an important aspect of the present invention, it has been found that the large amount of relative rotational displacement between the spool and sleeve substantially reduces the amount of lateral jerk which occurs during steering operations, even without the use of a cushion valve or an accumulator somewhere in the steering system. It is believed that the primary reason for the reduction in lateral jerk is that, as the vehicle operator uses more time to close the valving, from the 60 degree displacement, the vehicle is deccelerated, thus reducing its inertia and kinetic energy before the valving closes.

Figure 11:
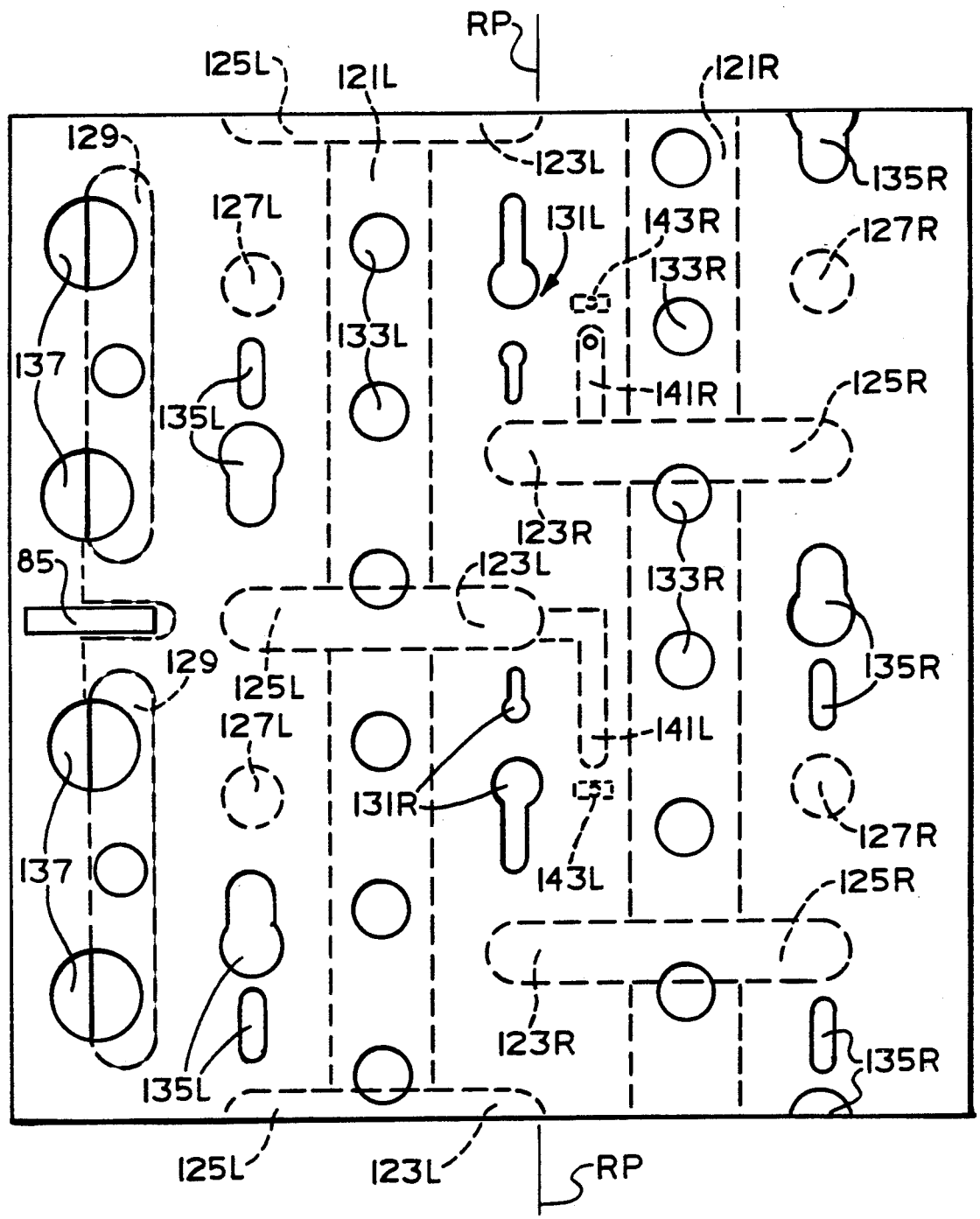
FIG. 11 is a fragmentary overlay view of the spool and sleeve illustrating an alternative embodiment of the present invention, with the spool and sleeve in the relative neutral position.
Figure 12:
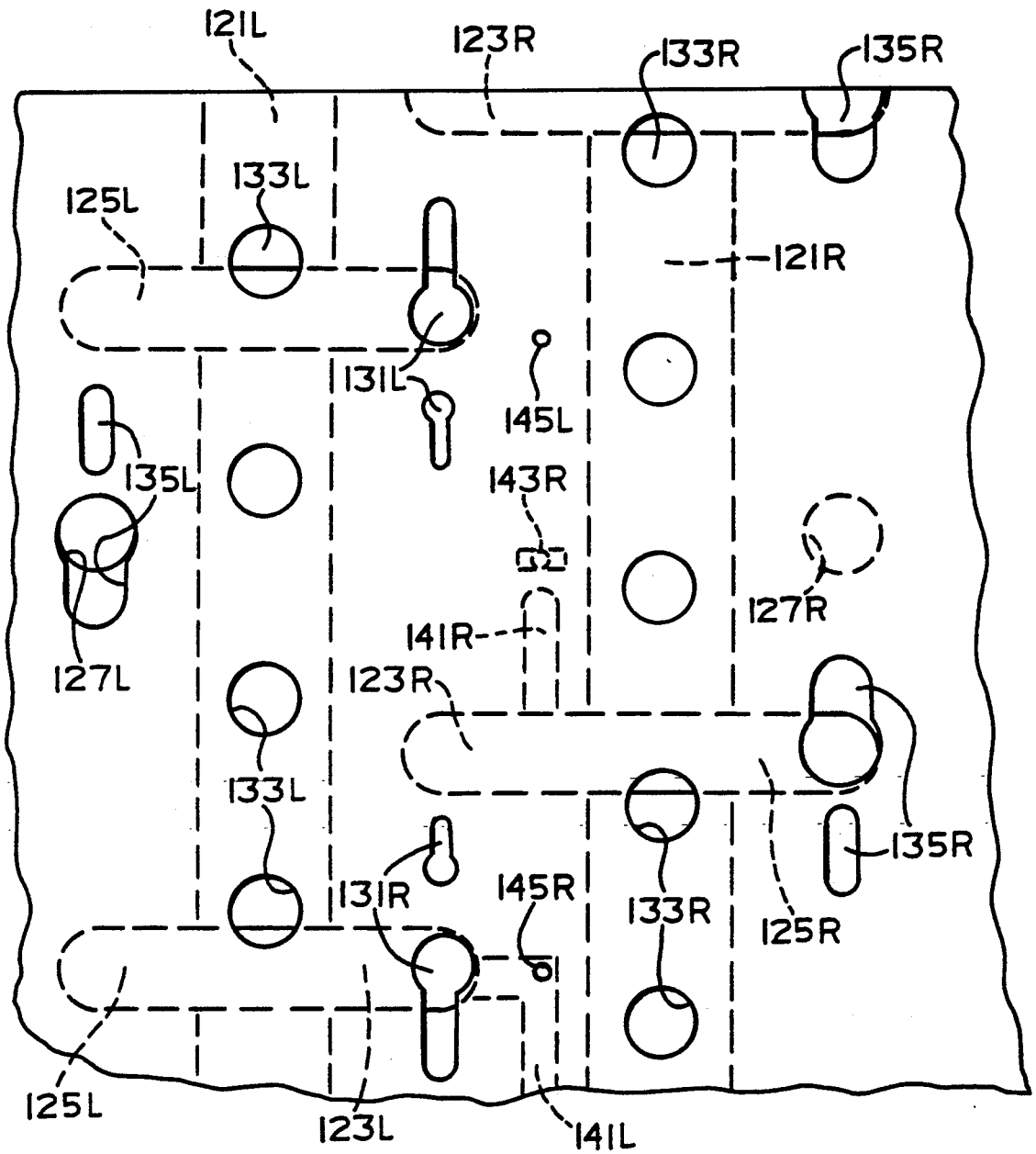
FIG. 12 is an overlay view, similar to FIG. 11, but showing the spool and sleeve of the alternative embodiment in the fully-displaced operating position.

FIGS. 11 and 12 - Alternative Embodiment

Referring now to FIGS. 11 and 12, there is illustrated an alternative embodiment of the present invention, in which the number of holes to be drilled in the sleeve 35 is greatly reduced. As is indicated in connection with the overlay view in FIG. 7, FIG. 11 is also intended to illustrate primarily the interface between the spool and sleeve. The grooves and passages defined by the outer surface of the spool are shown in dashed lines, and the port openings defined at an adjacent inner surface of the sleeve are shown in solid lines.

Also, as in the case of FIG. 7, the overlay view of FIG. 11 illustrates the entire 360 degree circumferential extent of both the spool and sleeve, whereas the enlarged, fragmentary view of FIG. 12 illustrates only a little more than 180° of the circumferential extent of the spool and sleeve. Another similarity is that the alternative embodiment can utilize the centering spring 55, illustrated in FIGS. 3-5, but in the alternative embodiment, the spring 55 is disposed toward the forward end of the spool and sleeve, rather than toward the rearward end as shown in FIG. 1. Note the location of the Woodruff key 85 in FIG. 11.

Referring first to FIG. 11, the spool defines a pair of circumferential meter grooves 121L and 121R, which are approximately oppositely and equally about the reference plane RP. In fluid communication with the meter groove 121L is a Pair of pressure passages 123L, and in fluid communication with the meter groove 121R is a pair of pressure passages 123R. Also in fluid communication with the meter groove 121L is a pair of operating passages 125L, and in fluid communication with the meter groove 121R is a pair of operating passages 125R. The spool also defines a pair of tank ports 127L, and a pair of tank ports 127R. As in the embodiment of FIG. 7, the tank ports 127L and 127R are in fluid communication with the interior of the spool, so that return fluid passes through the interior of the spool, and eventually communicates with the return port 25.

The sleeve defines two pairs of pressure ports 131L and 131R. In regard to the pressure ports, the designations "L" and "R" are not used to indicate position on opposite sides of the reference plane RP, but instead are used to indicate initial involvement in a left turn, or a right turn, respectively. As in the FIG. 7 embodiment, all of the ports which comprise the pressure ports 131L and 131R are disposed to be in continuous fluid communication with the inlet port 23.

The sleeve defines a plurality of meter ports 133L, and a plurality of meter ports 133R, in continuous fluid communication with the meter grooves 121L and 121R, respectively. Approximately equally and oppositely disposed about the reference plane RP are two pairs of operating ports 135L, and two pairs of operating ports 135R. The operating ports 135L are disposed to be in continuous fluid communication with the control port 27, while the operating ports 135R are disposed to be in continuous fluid communication with the control port 29.

The sleeve also defines a plurality of return ports 137, which are in open communication with the interior of the spool, by means of a pair of circumferentially-elongated pin openings 129. The return ports 137 are also in fluid communication with the return port 25, in the same manner as in the FIG. 7 embodiment.

For ease of illustration, the embodiment of FIGS. 11 and 12 does not include either the flow amplification feature, or the cylinder damping feature included within the FIG. 7 embodiment. However, it should be understood by those skilled in the art that either or both of those features could be included in the architecture illustrated in the embodiment of FIGS. 11 and 12.

Referring still to FIG. 11, the spool defines a circumferential passage 141L, which is in continuous fluid communication with the pressure passage 123L, and further includes a circumferential passage 141R, which is in continuous fluid communication with the pressure passage 123R. The purpose of the passages 141L and 141R will be described subsequently. Disposed adjacent the ends of the passages 141L and 141R are load signal drain bores 143L and 143R, respectively. The sleeve defines a pair of load sign passages 145L and 145R, which are not shown in FIG. 11, but instead are shown only in FIG. 12. Load signal passages 145L and 145R are not shown in FIG. 11 because, with the spool and sleeve in the relative neutral position shown in FIG. 11, the load signal passages 145L and 145R are in alignment with the load signal drain bores 143L and 143R, respectively. The load signal passages 145L and 145R are preferably in communication with a load signal groove (not shown) which may be defined by the sleeve and/or housing in a manner well known to those skilled in the art. The load signal groove is in communication with the load sensing port 79, shown schematically in FIG. 2.

Figure 13:
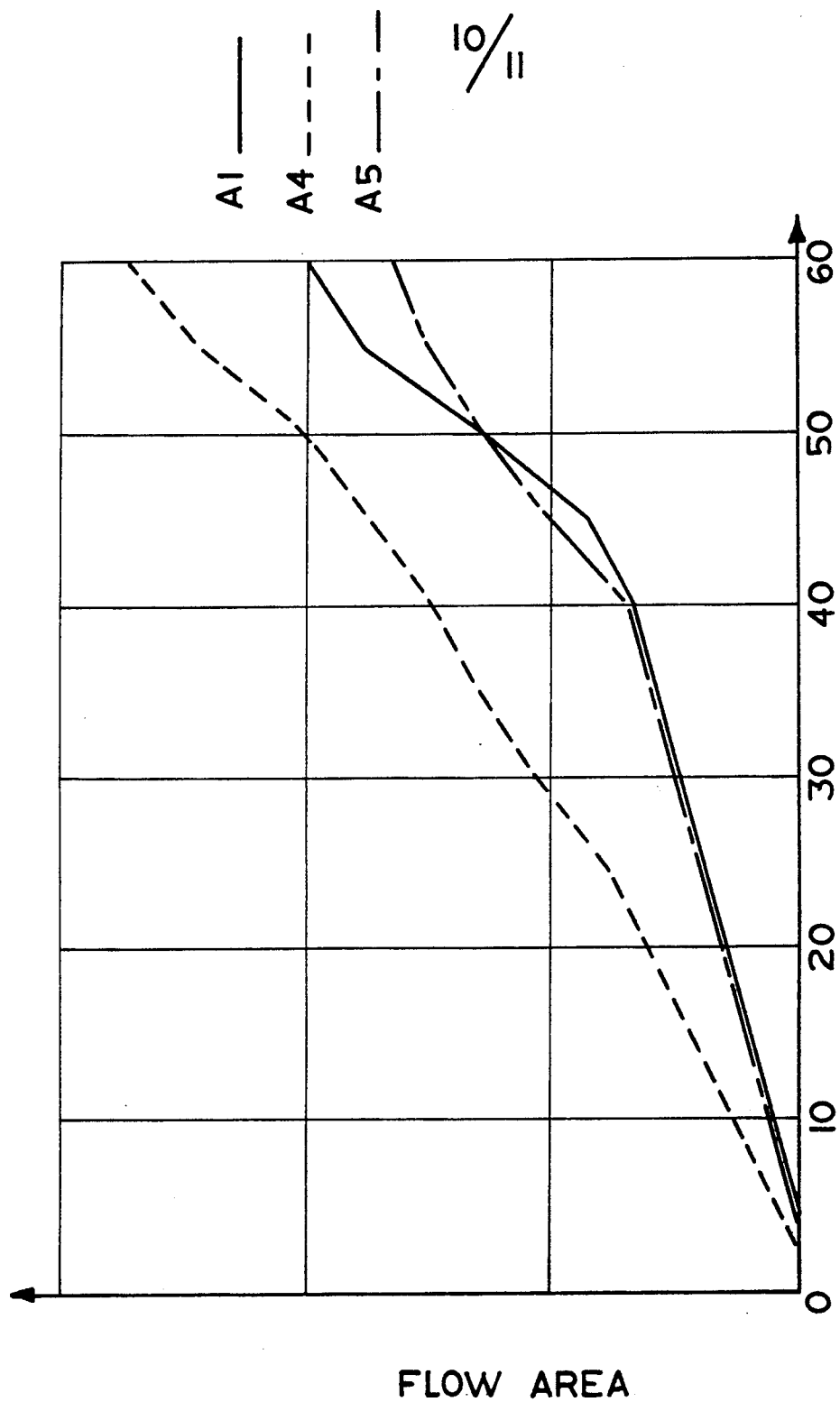
FIG. 13 is a graph of flow area versus valve displacement for several of the variable flow control orifices illustrated in FIG. 2.

When the steering wheel is rotated, the spool is displaced relative to the sleeve, as was explained previously, and referring now to FIG. 12, there is illustrated the alternative embodiment of the present invention, with the spool being displaced, relative to the sleeve, corresponding to a right turn condition. In FIG. 12, the spool and sleeve have been relatively displaced or rotated about 60 degrees, corresponding to the maximum displacement position. In connection with the subsequent description of the operation of the valving, reference should be made at the same time to FIG. 13, illustrating the flow area of the variable flow control orifices A1, A4, and A5, as a function of the relative displacement of the spool and sleeve.

For a right turn condition, the pressure passage 123L begins to communicate with the smaller of the pressure ports 131R, after about 5 degrees of relative displacement, thus forming the A1 orifice. At about the same time, the operating passages 125R begin to communicate with the smaller of the operating ports 135R to form the A4 orifice. The pressurized, metered fluid flowing through the A4 orifice then flows to the steering cylinder and returns from the cylinder, flowing through the operating ports 135L, which have already begun to communicate with the tank ports 127L, to form the A5 orifice.

As the relative displacement of the spool and sleeve increases, the flow area of the A1, A4, and A5 orifices continues to increase (in the same manner as for the FIG. 7 embodiment). As the spool and sleeve are rotated from their relative neutral position, fluid communication between the load signal drain bores 143L and 143R, and the load signal passages 145L and 145R, respectively, is discontinued, and for a right turn condition, the load signal passage 145R begins to communicate with the circumferential passage 141L, and is therefore able to communicate a pressure signal downstream of the A1 orifice to the load sensing port 79 in a manner which is now well known in the art.

Referring still to FIG. 12, when the relative displacement of the spool and sleeve has reached approximately 60 degrees, which is the maximum relative displacement for the spool and sleeve for this embodiment, the A1, A4, and A5 orifices have again reached their maximum flow area, in the same manner as in the FIG. 7 embodiment.

Figure 14:
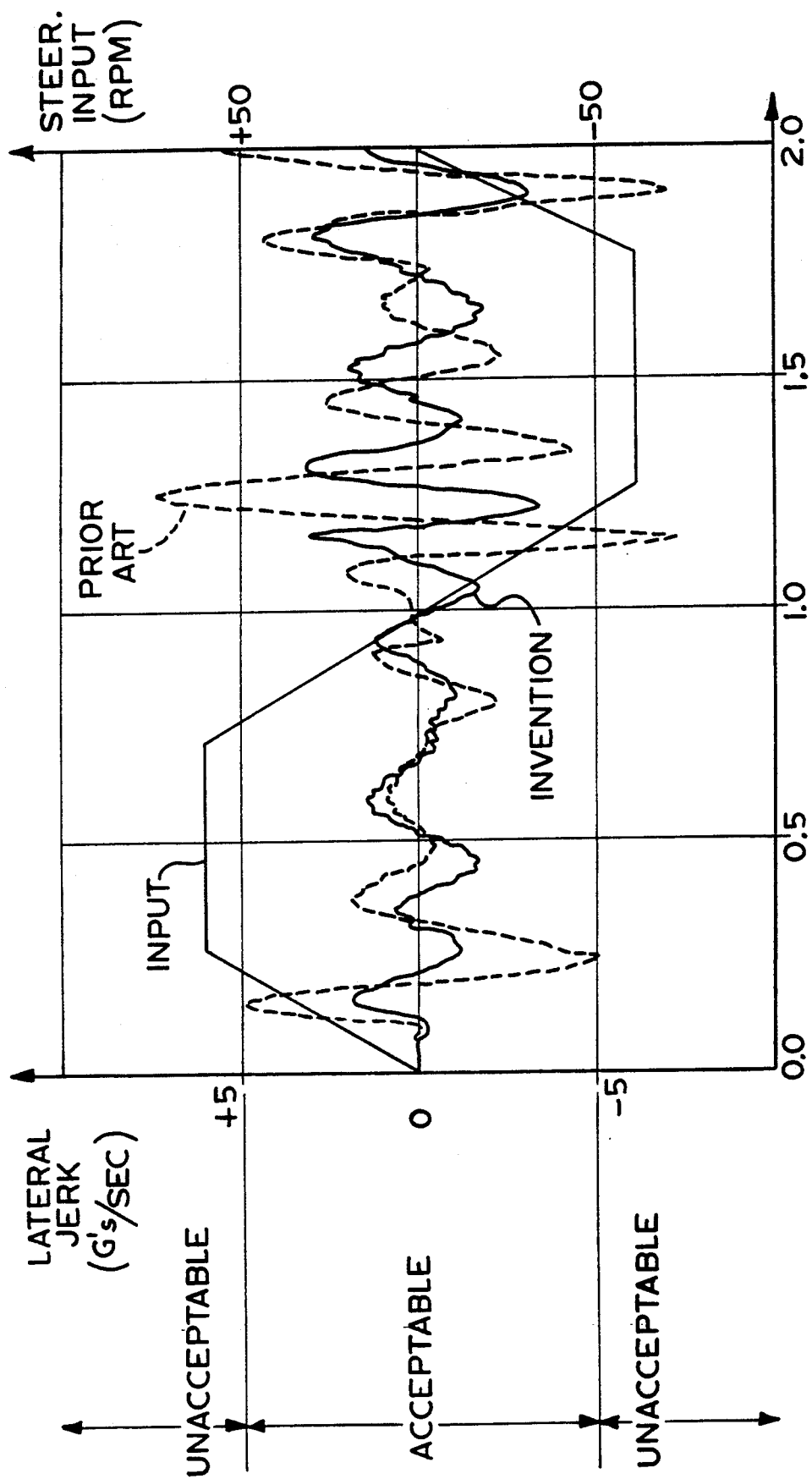
FIG. 14 is a graph of pivot jerk, in g's per second, versus time, with and without the present invention.

Referring now to FIG. 14, there is illustrated a comparison of controllers, with and without the present invention. FIG. 14 is a graph of lateral jerk (in G's per second) as a function of time, with the lateral jerk being measured at the vehicle operator's position on an articulated vehicle. As is generally well known to those skilled in the art, "lateral jerk" is the rate of change (first derivative) of acceleration. The graphs in FIG. 14 are computer-generated graphs, based upon a mathematical model of a controller of the type shown in FIG. 1. In the graph marked "PRIOR ART", the controller is equipped with valving of the type present in a controller sold commercially by the assignee of the present invention under the designation "Orb 25", in which the maximum displacement of the spool and sleeve is approximately 19 degrees. In the graph labeled "INVENTION", the valving is of the configuration illustrated in FIGS. 11 and 12 above. In neither case does the system include either a cushion valve or an accumulator, and in the mathematical model, the system and the controller are identical, except for the differences in the valving considerations and the maximum displacements of the spool and sleeve.

The ordinate of the graph in FIG. 14 has been subdivided into a central range, labeled "ACCEPTABLE", and above and below, a pair of ranges labeled "UNACCEPTABLE". These ranges labeled "ACCEPTABLE" and "UNACCEPTABLE" indicate levels of lateral jerk which have been found, by experience, to be either acceptable or unacceptable to vehicle manufacturers and their customers. As may be seen in FIG. 14, for the graph of the "PRIOR ART", there are many more excursions into the "UNACCEPTABLE" ranges than there are for the graph of the "INVENTION".

In the embodiment of FIGS. 7 through 9, each of the groups of ports consisted of 5 or 6 individual ports, whereas in the embodiment of FIGS. 11 and 12, each of the groups of ports consisted of 2 individual ports. It should be clearly understood that the particular number of ports comprising each group of ports is not an essential feature of the present invention. Furthermore, it is within the scope of the invention to configure the various slots and passages on the surface of the spool to achieve the communication over a wider angular displacement of the spool and sleeve.

The invention has been described in great detail in the foregoing specification; it is believed that various alterations and modifications of the invention will become apparent to those skilled in the art upon a reading and understanding of the specification, and it is intended to include all such alterations and modifications as part of the invention, insofar as they come within the scope of the appended claims.

I claim:

1. A controller operable to control the flow of fluid from a source of pressurized fluid to a fluid pressure operated device; said controller being of the type including housing means defining an inlet port for connection to the source of pressurized fluid, a return port for connection to a reservoir, and first and second control fluid ports for connection to the fluid pressure operated device; valve means disposed in said housing means, and comprising a primary, rotatable valve member and a cooperating, relatively rotatable follow-up valve member, said primary and follow-up valve members defining a neutral position and a first operating position in which said primary valve member is rotatably displaced from said neutral position, relative to said follow-up valve member; said primary valve member defining a first fluid passage, and said follow-up valve member defining first fluid port means in continuous fluid communication with said inlet port; said first fluid port means being blocked from fluid communication with said first fluid passage when said valve members are in said neutral position; said first fluid port means being in fluid communication with said first fluid passage, to define a first variable flow control orifice, when said valve members are in said first operating position; said housing means and said valve members cooperating to define a first main fluid path providing fluid communication from said inlet port through said first variable flow control orifice to said first control fluid port, when said valve members are in said first operating position; characterized by:

(a) said first fluid passage comprises an axially-oriented passage defined by an outer, cylindrical surface of said primary valve member; and (b) said first fluid port means comprises circumferentially-extending port means operable to provide continuous fluid communication between said inlet port and said first fluid passage as said primary valve member rotates, relative to said follow-up valve member, from said neutral position to said first operating position, said relative rotation of said primary valve member extending at least about forty-five degrees.

2. A controller as claimed in claim 1 characterized by said relative rotation extending at least about sixty degrees.

3. A controller as claimed in claim 1 characterized by said first fluid port means comprises a series of circumferentially spaced-apart ports extending over at least about forty-five degrees of said follow-up valve member.

4. A controller as claimed in claim 1 characterized by said first fluid port means comprises a series of circumferentially spaced-apart ports extending over at least about sixty degrees of said follow-up valve member, said ports being sized such that the flow area of said first variable flow control orifice gradually increases as said valve members are displaced from said neutral position to said first operating position.

5. A controller as claimed in claim 1 characterized by fluid actuated means for imparting follow-up movement to said follow-up valve member proportional to the volume of fluid flow through said first main fluid path when said valve members are in said first operating position.

6. A controller as claimed in claim 5 characterized by said fluid actuated means being disposed in series flow relationship in said first main fluid path, downstream of said first variable flow control orifice.

7. A controller as claimed in claim 6 characterized by said primary valve member defining a second fluid passage, and said follow-up valve member defining second fluid port means in continuous fluid communication with said first control fluid port; said second fluid port means being blocked from fluid communication with said second fluid passage when said valve members are in said neutral position ; said second fluid port means being in fluid communication with said second fluid passage, to define a second variable flow control orifice, when said valve members are in said first operating position.

8. A controller as claimed in claim 7 characterized by said second fluid passage comprises an axially-oriented passage defined by said outer, cylindrical surface of said primary valve member, and said second fluid port means comprises circumferentially extending port means operable to provide continuous fluid communication between said second fluid passage and said first control fluid port as said primary valve member rotates, relative to said follow-up valve member, from said neutral position to said first operating position, said relative rotation extending over at least about forty-five degrees.

9. A controller as claimed in claim 8 characterized by said relative rotation extending at least about sixty degrees.

10. A controller as claimed in claim 8 characterized by said second fluid port means comprises a series of circumferentially spaced-apart ports extending over at least about forty-five degrees of said follow-up valve member.

11. A controller as claimed in claim 8 characterized by said second fluid port means comprises a series of circumferentially spaced-apart ports extending over at least about sixty degrees of said follow-up valve member, said ports being sized such that the flow area of said second variable flow control orifice gradually increases as said valve members are displaced from said neutral position to said first operating position.

12. A controller as claimed in claim 1 characterized by said housing means and said valve members cooperating to define a second main fluid path providing fluid communication from said second control fluid port to said return port when said valve members are in said first operating position.

13. A controller as claimed in claim 12 characterized by said primary valve member defining a third fluid passage, and said follow-up valve member defining third fluid port means in continuous fluid communication with said second control fluid port; said third fluid port means being blocked from fluid communication with said third fluid passage when said valve members are in said neutral position; said third fluid port means being in fluid communication with said third fluid passage to define a third variable flow control orifice, when said valve members are in said first operating position.

14. A controller as claimed in claim 13 characterized by said third fluid passage comprises a bore defined by said primary valve member, and said third fluid port means comprises circumferentially extending port means operable to provide continuous fluid communication between said second control fluid port and said third fluid passage as said primary valve member rotates, relative to said follow-up valve member, from said neutral position to said first operating position, said relative rotation extending over at least about forty-five degrees.

15. A controller as claimed in claim 14 characterized by said relative rotation extending over at least about sixty degrees.

16. A controller as claimed in claim 14 characterized by said third fluid port means comprises a series of circumferentially spaced-apart ports extending over at least about forty-five degrees of said follow-up valve member.

17. A controller as claimed in claim 14 characterized by said third fluid port means comprises a series of circumferentially spaced-apart ports extending over at least about sixty degrees of said follow-up valve member, said ports being sized such that the flow area of said third variable flow control orifice gradually increases as said valve members are displaced from said neutral position to said first operating position.

18. A controller operable to control the flow of fluid from a source of pressurized fluid to a fluid pressure operated device; said controller being of the type including housing means defining an inlet port for connection to the source of pressurized fluid, a return port for connection to a reservoir, and first and second control fluid ports for connection to the fluid pressure operated device; valve means disposed in said housing means, and comprising a primary, rotatable valve member and a cooperating, relatively rotatable follow-up valve member, said primary and follow-up valve members defining a neutral position and first and second operating positions in which said primary valve member is rotatably displaced from said neutral position, relative to said follow-up valve member, in first and second opposite directions; said primary valve member defining a first fluid passage and a second fluid passage, and said follow-up valve member defining first fluid port means and second fluid port means, both of said first and second fluid port means being in continuous fluid communication with said inlet port; said first fluid port means being blocked from fluid communication with said first fluid passage, and said second fluid port means being blocked from fluid communication with said second fluid passage when said valve members are in said neutral position; said first fluid port means being in fluid communication with said first fluid passage, to define one variable flow control orifice, when said valve members are in said first operating position; said second fluid port means being in fluid communication with said second fluid passage to define another variable flow control orifice, when said valve members are in said second operating position; said housing means and said valve members cooperating to define a first main fluid path providing fluid communication from said inlet port through said one variable flow control orifice to said first control fluid port when said valve members are in said first operating position, and a second main fluid path providing fluid communication from said inlet port through said another variable flow control orifices to said second control fluid port, when said valve members are in said second operating position; characterized by:

(a) said first and second fluid passages comprise axially-oriented passages defined by an outer cylindrical surface of said primary valve member;

(b) said first fluid port means comprises circumferentially-extending port means operable to provide continuous fluid communication between said inlet port and said first fluid passage as said primary valve member rotates, relative to said follow-up valve member, from said neutral position to said first operating position, and said second fluid port means comprises circumferentially- extending port means operable to provide continuous fluid communication between said inlet port and said second fluid passage as said primary valve member rotates, relative to said follow-up valve member, from said neutral position to said second operating position; and (c) said relative rotation of said primary valve member from said neutral position to said first operating position extending at least about forty-five degrees in said first direction, and said relative rotation from said neutral position to said operating position extending at least about forty-five degrees in said second direction.

19. A controller as claimed in claim 18 characterized by said relative rotation extending at least about sixty degrees in said first direction and at least about sixty degrees in said second direction.

20. A controller as claimed in claim 18 characterized by said first fluid port means comprises a series of circumferentially spaced-apart ports extending over at least about forty-five degrees of said follow-up valve member, and said second fluid port means comprises a series of circumferentially spaced-apart ports extending over at least about forty-five degrees of said follow-up valve member.

21. A controller as claimed in claim 18 characterized by said first fluid port means comprises a series of circumferentially spaced-apart first ports extending over at least about sixty degrees of said follow-up valve member, and said second fluid port means comprises a series of circumferentially spaced-apart second ports extending over at least about sixty degrees of said follow-up valve member, said first ports and said second ports being sized such that the flow areas of said one and said another variable flow control orifices gradually increase as said valve members are displaced from said neutral position to said first operating position and said second operating position, respectively.

22. A controller as claimed in claim 18 characterized by fluid actuated means for imparting follow-up movement to said follow-up valve member proportional to the volume of fluid flowing through said first and second main fluid paths when said valve members are in said first and second operating positions, respectively.

23. A controller as claimed in claim 22 characterized by said fluid actuated means being disposed in series flow relationship in said first main fluid path, downstream of said one variable flow control orifice, when said valve members are in said first operating position, and being disposed in series flow relationship in said second main fluid path, downstream of said another variable flow control orifice, when said valve members are in said second operating position.

24. A controller operable to control the flow of fluid from a source of pressurized fluid to a fluid pressure operated device; said controller being of the type including housing means defining an inlet port for connection to the source of pressurized fluid, a return port for connection to a reservoir, and first and second control fluid ports for connection to the fluid pressure operated device; valve means disposed in said housing means, and comprising a primary, rotatable valve member and a cooperating, relatively rotatable follow-up valve member, said primary and follow-up valve members defining a neutral position and a first operating position in which said primary valve member is rotatably displaced from said neutral position, relative to said follow-up valve member; fluid actuated means for imparting follow-up movement to said follow-up valve member proportional to the volume of fluid flow through said fluid actuated means when said valve members are in said first operating position; said primary and follow-up valve members cooperating to define first, second and third variable flow control orifices when said valve members are in said first operating position; said housing means and said valve members cooperating to define a first main fluid path providing fluid communication from said inlet port through said first variable flow control orifice, through said fluid actuated means, through said second variable flow control orifice to said first control fluid port, then from said second control flow port through said third variable flow control orifice to said return port; characterized by:

(a) each of said first second, and third variable flow control orifices being defined in part by circumferentially-extending first port means in continuous fluid communication with said inlet port, second port means in continuous fluid communication with said first control fluid port, and third port means in continuous fluid communication with said second control fluid port; and (b) said primary valve member defining first, second and third fluid passages defined by an outer, cylindrical surface of said primary valve member, said first, second, and third fluid passages being in fluid communication with said circumferentially-extending first, second, and third port means as said primary valve member rotates, relative to said follow-up valve member, from said neutral position to said first operating position, said relative rotation extending at least about forty-five degrees.

25. A controller as claimed in claim 24 characterized by said relative rotation of said primary valve member extending at least about sixty degrees.

26. A controller as claimed in claim 24 characterized by each of said first, second, and third fluid port means comprises a series of circumferentially spaced-apart ports extending over at least about forty-five degrees of said follow-up valve member.

27. A controller as claimed in claim 24 characterized by each of said first, second, and third fluid port means comprises a series of circumferentially spaced-apart ports extending over at least about sixty degrees of said follow-up valve member, said ports being sized such that the flow areas of said first, second, and third variable flow control orifices gradually increase as said valve members are displaced from said neutral position to said first operating position.

* * * * *